United States Patent
Starkovich et al.

(10) Patent No.: US 9,920,178 B2
(45) Date of Patent: Mar. 20, 2018

(54) COMPRESSIBLE, THERMALLY-CONDUCTIVE, REMOVABLE NANOCOMPOSITE GASKET

(71) Applicant: Northrop Grumman Systems Corporation, Falls Church, VA (US)

(72) Inventors: John A. Starkovich, Redondo Beach, CA (US); Jesse B. Tice, Torrance, CA (US); Edward M. Silverman, Encino, CA (US); Hsiao-Hu Peng, Rancho Palos Verdes, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/966,746

(22) Filed: Dec. 11, 2015

(65) Prior Publication Data

US 2017/0166721 A1 Jun. 15, 2017

(51) Int. Cl.
*B32B 9/00* (2006.01)
*C08J 9/35* (2006.01)
*C08J 9/00* (2006.01)
*C09K 5/14* (2006.01)

(52) U.S. Cl.
CPC ............ *C08J 9/35* (2013.01); *C08J 9/008* (2013.01); *C09K 5/14* (2013.01); *C08J 2375/04* (2013.01); *C08J 2383/04* (2013.01); *Y10T 428/30* (2015.01)

(58) Field of Classification Search
CPC .......... C01B 31/022–31/0293; C01B 31/0438; C01B 2202/00; Y10T 428/30
USPC ............................ 428/408; 423/448; 165/185
See application file for complete search history.

(56) References Cited

U.S. PATENT DOCUMENTS

| | | | |
|---|---|---|---|
| 2,858,580 A * | 11/1958 | Thompson | B62D 33/048 105/360 |
| 5,783,862 A | 7/1998 | Deeney | |
| 5,806,803 A | 9/1998 | Watts | |
| 6,190,751 B1 | 2/2001 | Sylvester | |
| 7,112,472 B2 * | 9/2006 | Dubin | H01L 21/4871 257/E23.09 |
| 7,144,624 B2 | 12/2006 | Knowles et al. | |
| 8,220,530 B2 | 7/2012 | Cola et al. | |

(Continued)

FOREIGN PATENT DOCUMENTS

EP    2388195    11/2011

OTHER PUBLICATIONS

Baur, J. et al; Challenges and Opportunities for Nanotechnology in Multifunctional Composite Structures; Materials Research Society (MRS) Bulletin, vol. 32, Issue 4, Apr. 2007, pp. 328-334.

(Continued)

*Primary Examiner* — Daniel H Miller
(74) *Attorney, Agent, or Firm* — Pati & Malvone Law Group, LLC

(57) ABSTRACT

A compressible, thermally-conductive, removable nanocomposite gasket includes: a nanocomposite foam; and a nanoparticle filler, wherein the nanocomposite foam has a filler loading of less than approximately 20%. A compressible, thermally-conductive, removable nanocomposite gasket includes: a nanocomposite foam; a nanoparticle filler; and a metallic mesh embedded in the foam wherein the nanocomposite foam has a filler loading of less than approximately 20%.

1 Claim, 6 Drawing Sheets

(56) References Cited

U.S. PATENT DOCUMENTS

| | | | |
|---|---|---|---|
| 2009/0096087 A1* | 4/2009 | Sauciuc | H01L 23/3735 257/717 |
| 2011/0180524 A1* | 7/2011 | Brittingham | C08J 3/18 219/202 |
| 2013/0233515 A1 | 9/2013 | Aston | |
| 2014/0151009 A1 | 6/2014 | Bahadur et al. | |
| 2014/0224466 A1 | 8/2014 | Lin et al. | |
| 2015/0348669 A1* | 12/2015 | Adamson | H01B 1/124 252/511 |

OTHER PUBLICATIONS

Verdejo, R. et al; Functionalized graphene sheet filled silicone foam nanocomposites; Journal of Materials Chemistry 18, No. 19 (2008); pp. 2221-2226; DOI: 10.1039/b718289a.

Lobos, J. et al; How much do nanoparticle fillers improve the modulus and strength of polymer foams?; Journal of Cellular Plastics (2014): 0021955X14546015; pp. 1-32.

Goldberg, G. H. et al; The effect of multiwall carbon nanotubes on the properties of room temperature-vulcanized silicone adhesives; Journal of Adhesion Science and Technology 28, No. 17 (2014); pp. 1661-1676.

Chen, L. et al; Polymer nanocomposite foams; Journal of Materials Chemistry A 1, No. 12 (2013); pp. 3837-3850; The Royal Society of Chemistry 2013; RSC Publishing.

Savage, S. J.; Defence applications of nanocomposite materials; FOI Swedish Defence Research Agency, 2004; FOI-R-1456-SE; Dec. 2004; ISSN 1650-1942; User Report; Sensor Technology; SE-581 11 Linkoping; 20 pages.

Rawal, S. et al; Development of carbon nanotube-based composite for spacecraft components; Recent Advances in Space Technologies (RAST), 2013 6th International Conference on, pp. 13-19; Jun. 12-14, 2013.

* cited by examiner

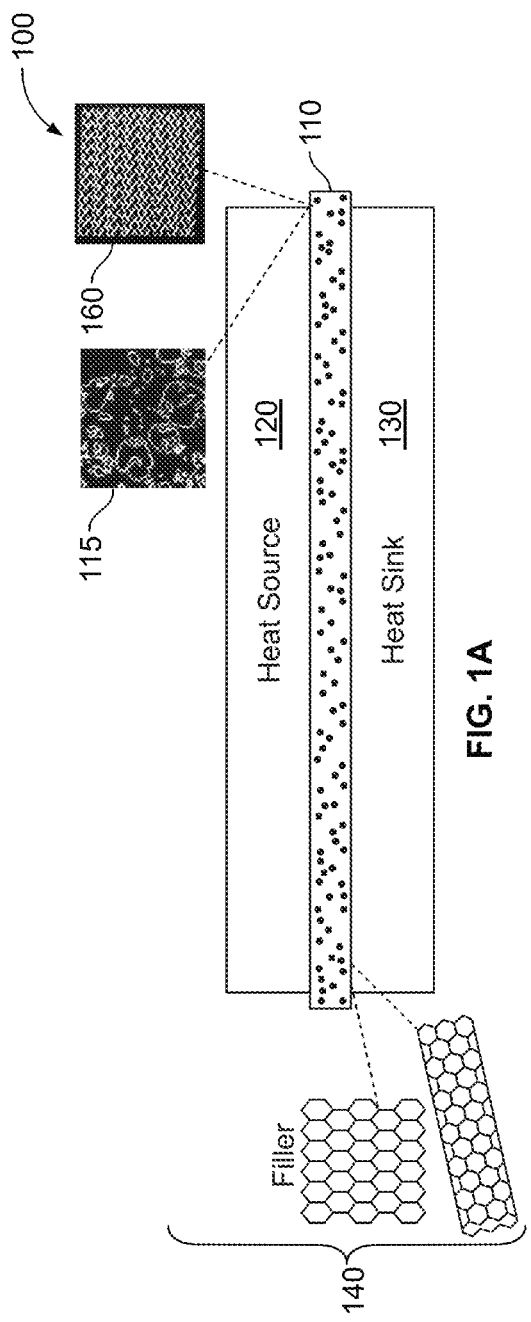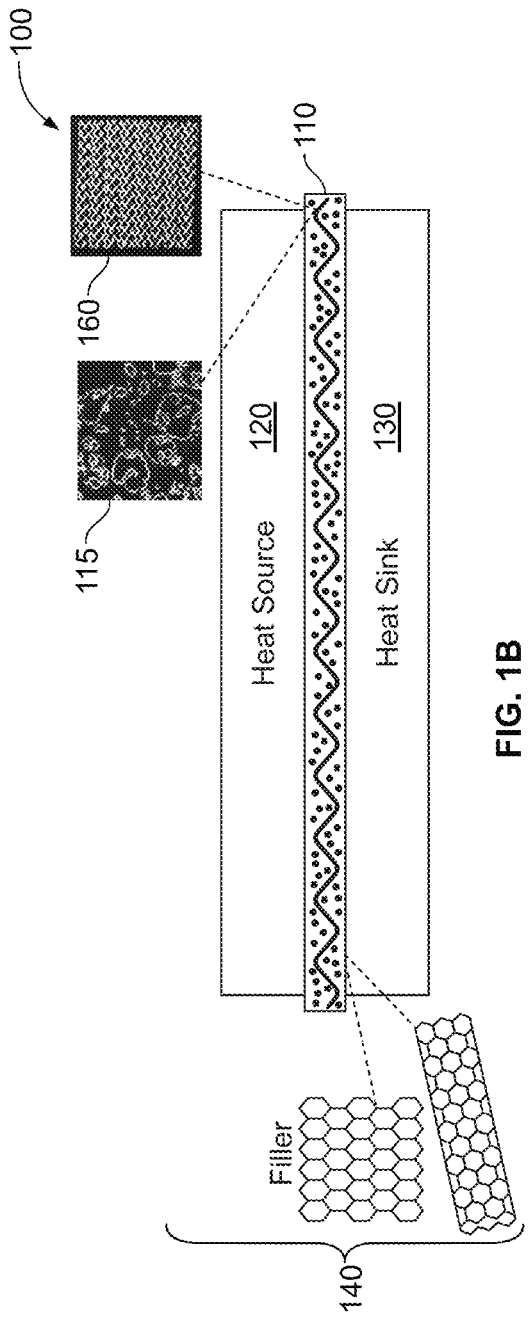

COMPRESSIBLE, THERMALLY-CONDUCTIVE, REMOVABLE NANOCOMPOSITE GASKET

SUMMARY

A compressible, thermally-conductive, removable nanocomposite gasket comprises: a nanocomposite foam; and a nanoparticle filler, wherein the nanocomposite foam has a filler loading of less than approximately 20%.

A compressible, thermally-conductive, removable nanocomposite gasket comprises: a nanocomposite foam; a nanoparticle filler; and a metallic mesh embedded in the foam, wherein the nanocomposite foam has a filler loading of less than approximately 20%.

A compressible, thermally-conductive, removable nanocomposite gasket comprises: a nanocomposite foam comprising partially oxidized graphene (GOx), wherein the carbon:oxygen (C:O) ratio of the GOx is adjusted using an elevated temperature treatment of the nanocomposite foam ranging between approximately 120 degrees Centigrade and approximately 180 degrees Centigrade, the elevated temperature treatment effects an in situ conversion of GOx to graphene; a nanoparticle filler; and a metallic mesh embedded in the foam, wherein the graphene enhances the thermal conductivity of the nanocomposite foam by a factor of at least approximately five, and wherein the nanocomposite foam has a filler loading of less than approximately 20%.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIGS. 1A-1B are a set of two drawings of different examples of a compressible, thermally-conductive, removable nanocomposite gasket.

DETAILED DESCRIPTION

Figure 2B:
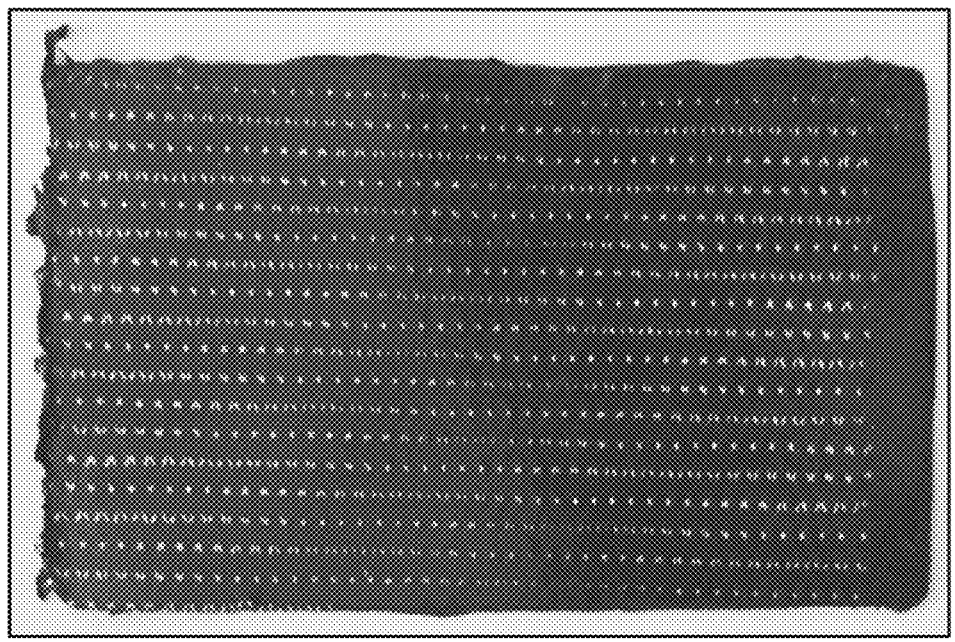
FIGS. 2A-2B are a set of two photographs of different examples of a compressible, thermally-conductive, removable nanocomposite gasket.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

According to embodiments of the invention, a compressible, thermally-conductive, removable nanocomposite gasket is provided. For example, the gasket may comprise nanocomposite foam. For example, the nanocomposite foam comprises one or more nanocomposite appliques. For example, the nanocomposite foam comprises one or more of a silicone polymer, a urethane polymer, and another nanocomposite foam.

According to further embodiments of the invention, the compressible, thermally-conductive, removable nanocomposite gasket may be positioned between a heat source and a heat sink. For example, the heat source may comprise a component configured to generate heat. For example, the heat source may comprise a component that generates heat as a byproduct of its operation. For example, the heat sink may comprise a structural panel. For example, the compressible, thermally-conductive, removable nanocomposite gasket is configured to direct heat from the heat source to the heat sink.

The compressible, thermally-conductive, removable nanocomposite gasket can be used with one or more simple mechanical fasteners for attaching to a heat source. For example, the fastener comprises one or more of a bolt, a latch, a spring fastener, and another type of fastener. According to embodiments of the invention, the compressible, thermally-conductive, removable nanocomposite gasket comprises nanocomposite foam. According to additional embodiments of the invention, the compressible, thermally-conductive, removable nanocomposite gasket comprises hybrid foam material and an embedded corrugated mesh. For example, the mesh is one or more of corrugated, bent and folded in a manner to span the thickness of the gasket. For example, the mesh comprises a plurality of one or more of exposed corrugations and edge surfaces.

An innovative concept behind embodiments of the invention relates to thermally conductive nanocomposite appliqués and foams that can be used as an unbonded, compliant, gasket-like material to assist heat transfer between cooling structures and heat generating electronic boxes mounted to them. Unique silicone polymer nanocomposites are provided in both foam and appliqué forms that can meet these challenging requirements.

FIGS. 1A-1B are a set of two drawings of different examples of a compressible, thermally-conductive, removable nanocomposite gasket.

FIG. 1A is a drawing of the compressible, thermally-conductive, removable nanocomposite gasket 110, the compressible, thermally-conductive, removable nanocomposite gasket 110 comprising nanocomposite foam 115. For example, the nanocomposite foam 115 comprises one or more of a silicone polymer, a urethane polymer, and another nanocomposite foam. For example, the nanocomposite foam 115 comprises one or more of a silicone polymer, a urethane polymer, and another nanocomposite foam.

The compressible, thermally-conductive, removable nanocomposite gasket 110 is attached to a heat source 120, the compressible, thermally-conductive, removable nanocomposite gasket also being attached to a heat sink 130. The compressible, thermally-conductive, removable nanocomposite gasket 110 is placed between the heat source 120 and the heat sink 130 so as to facilitate a flow of heat from the heat source 120 to the heat sink 130.

The gasket 110 further comprises a nanoparticle filler 140. For example, the nanoparticle filler 140 comprises a thin section of nanocomposite planar filler 140 filled with planar shaped nano-particles. For example, nanocomposite planar filler 140 having a thickness between approximately 0.1 millimeters (mm) and approximately 5 mm. For example, the nanocomposite filler 140 comprises tubular filler 140.

For example, the nanocomposite foam 115 is loaded with particles. For example, the nanocomposite foam 115 is loaded with highly conductive particles. For example, the nanocomposite foam 115 is loaded with particles having a thermal conductivity of greater than approximately 50 Watts per meter-Kelvin (W-mK). For example, the nanocomposite foam 115 has a low loading of the particles. For example, the filler loading of the nanocomposite foam 115 is less than approximately 20%.

For example, the filler 140 comprises one or more of graphene, graphene stacks comprising a few layers of graphene, single wall carbon nanotubes (SWCNTs), multiwall carbon nanotubes (MWCNTs), boron nitride nanotubes, metal nanowires (MNWs), partially oxidized graphene (GOx), plated CNTs, plated SWCNTs, plated boron nitride nanotubes, plated MNWs, and plated GOx. Boron nitride is useful in providing filler 140 capable of simultaneously being thermally conducting and electrically insulating.

For example, the MNWs have a high aspect ratio. For example, one or more of a degree of oxidation of the GOx and the carbon:oxygen (C:O) atom ratio of the GOx are adjusted. For example, the adjustment is performed in order to increase the thermal conductivity of the GOx. For example, the C:O ratio of the GOx is adjusted using an elevated temperature treatment of the nanocomposite foam 115. For example, the C:O ratio of GOx is adjusted using an elevated temperature treatment of the nanocomposite foam 115 ranging between approximately 120 degrees Centigrade and approximately 180 degrees Centigrade. For example, the elevated temperature treatment effects an in situ GOx-to-graphene conversion. For example, the elevated temperature treatment enhances the thermal conductivity of the nanocomposite foam 115. For example, the elevated temperature treatment enhances the thermal conductivity of the nanocomposite foam 115 by a factor of at least approximately two. For example, the elevated temperature treatment enhances the thermal conductivity of the nanocomposite foam 115 by a factor of at least approximately five.

FIG. 1B is a drawing of the compressible, thermally-conductive, removable nanocomposite gasket 110, the compressible, thermally-conductive, removable nanocomposite gasket 110 again comprising nanocomposite foam 115. For example, the nanocomposite foam 115 comprises one or more of a silicone polymer, a urethane polymer, and another nanocomposite foam. For example, the nanocomposite foam 115 comprises one or more of a silicone polymer, a urethane polymer, and another nanocomposite foam.

The compressible, thermally-conductive, removable nanocomposite gasket is again attached to the heat source 120, the compressible, thermally-conductive, removable nanocomposite gasket again also being attached to the heat sink 130. The compressible, thermally-conductive, removable nanocomposite gasket 110 is again placed between the heat source 120 and the heat sink 130 so as to facilitate a flow of heat from the heat source 120 to the heat sink 130.

The gasket 110 again further comprises a nanoparticle filler 140. For example, the filler 140 comprises one or more of graphene, graphene stacks comprising a few layers of graphene, single wall carbon nanotubes (SWCNTs), multi-wall carbon nanotubes (MWCNTs), boron nitride nanotubes, metal nanowires (MNWs), partially oxidized graphene (GOx), plated CNTs, plated SWCNTs, plated boron nitride nanotubes, plated MNWs, and plated GOx. Boron nitride is useful in providing filler 140 capable of simultaneously being thermally conducting and electrically insulating.

For example, the nanocomposite foam 115 is loaded with particles. For example, the nanocomposite foam 115 is loaded with highly conductive particles. For example, the nanocomposite foam 115 is loaded with particles having a thermal conductivity of greater than approximately 50 Watts per meter-Kelvin (W-mK). For example, the nanocomposite foam 115 has a low loading of the particles. For example, the filler loading of the nanocomposite foam 115 is less than approximately 20%.

In FIG. 1B, the compressible, thermally-conductive, removable nanocomposite gasket 110 further comprises a mesh 160. For example, the mesh 160 comprises a corrugated mesh 160. For example, the mesh 160 comprises a flexible mesh 160. For example, the mesh 160 has a flexural modulus of less than approximately 0.5 GigaPascal (GPa). For example, the mesh 160 comprises a mesh having good thermal conductivity. For example, the mesh 160 has thermal conductivity of at least approximately 1 Watt per meter-Kelvin (W-mK). For example, the mesh 160 is embedded in the nanocomposite foam 115. For example, the mesh 160 comprises one or more of foil, copper mesh, silver mesh, aluminum mesh, tungsten mesh, gold mesh, another metal mesh, an alloy of one or more metal, and one or more plated metals. For example, the foil is perforated. For example, the mesh comprises one or more of woven mesh and non-woven mesh.

Figure 2A:
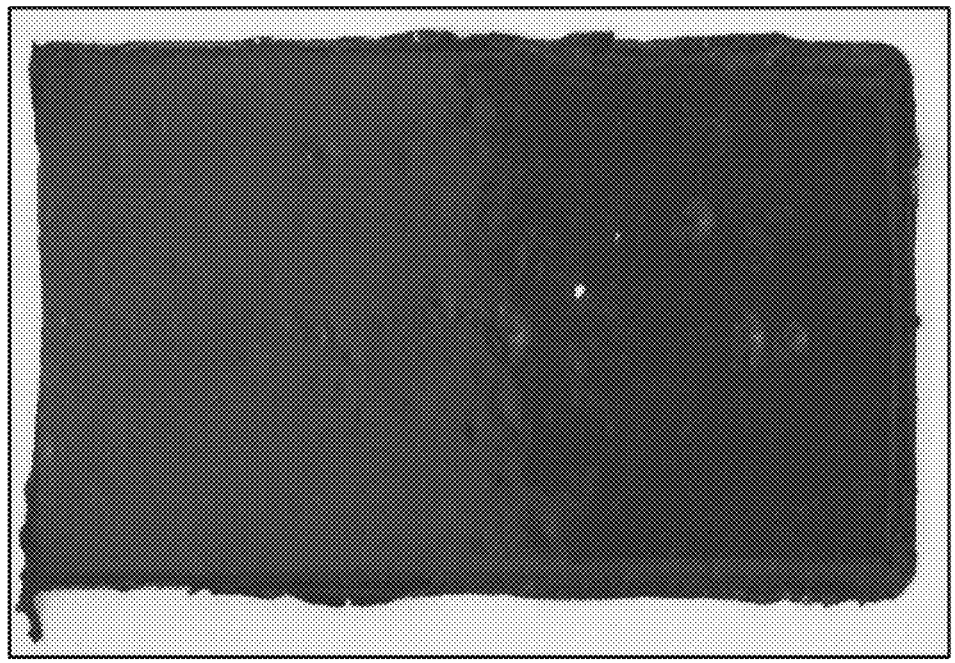

FIGS. 2A-2B are a set of two photographs of different examples of a compressible, thermally-conductive, removable nanocomposite gasket. FIG. 2A is a photograph of the compressible, thermally-conductive, removable nanocomposite gasket comprising silicone foam and graphene. FIG. 2B is a photograph of the compressible, thermally-conductive, removable nanocomposite gasket comprising silicone foam with graphene and a corrugated aluminum mesh.

Figure 3B:
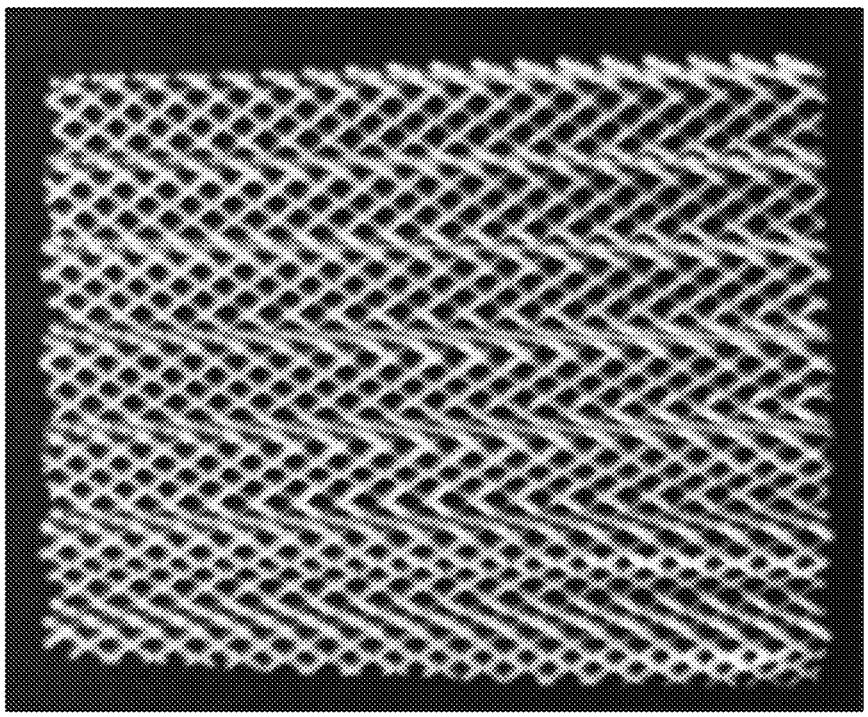
FIGS. 3A-3B are a set of two photographs of ⅛ inch and 1/16 inch corrugated silver mesh suitable for inclusion in the compressible, thermally-conductive, removable nanocomposite gasket.
Figure 3A:
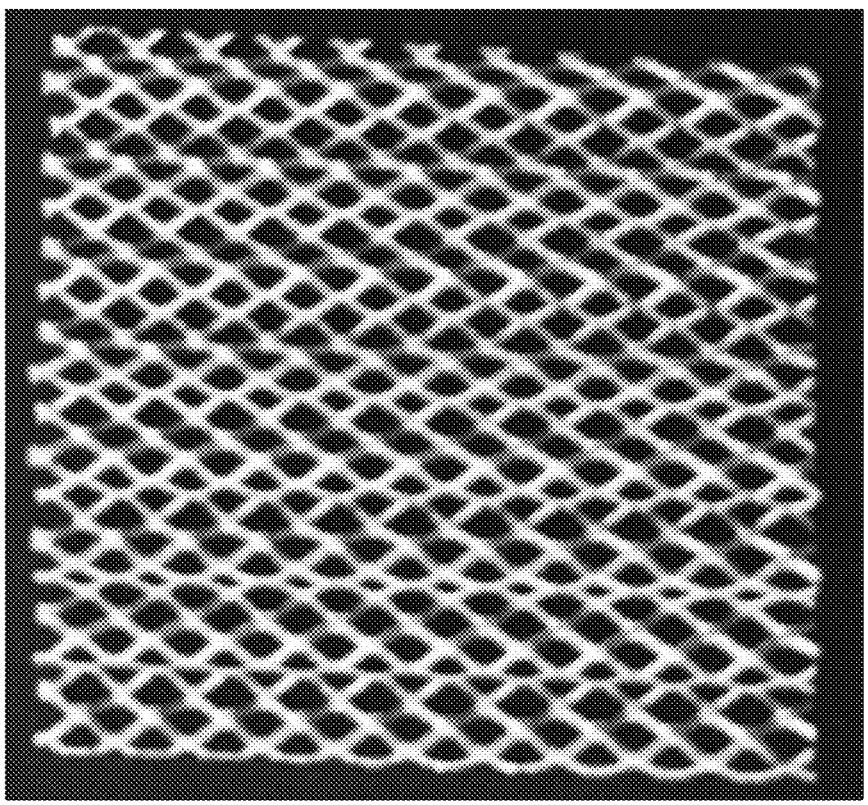

FIGS. 3A-3B are a set of two photographs of nonwoven, corrugated silver mesh suitable for inclusion in the compressible, thermally-conductive, removable nanocomposite gasket.

FIG. 3A is a photograph of nonwoven, corrugated silver ⅛-inch mesh suitable for inclusion in the compressible, thermally-conductive, removable nanocomposite gasket.

FIG. 3B is a photograph of nonwoven, corrugated silver 1/16-inch mesh suitable for inclusion in the compressible, thermally-conductive, removable nanocomposite gasket.

Figure 4A:
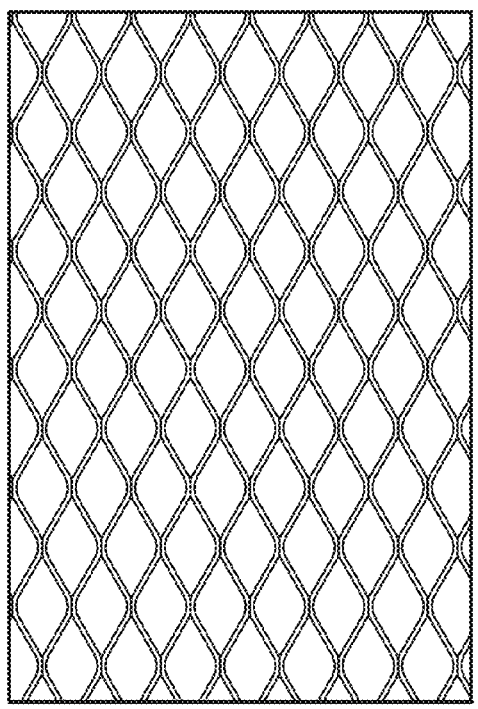
FIGS. 4A-4B are a set of two illustrative drawings of nonwoven, uncorrugated aluminum mesh suitable for inclusion in the compressible, thermally-conductive, removable nanocomposite gasket.
Figure 4B:
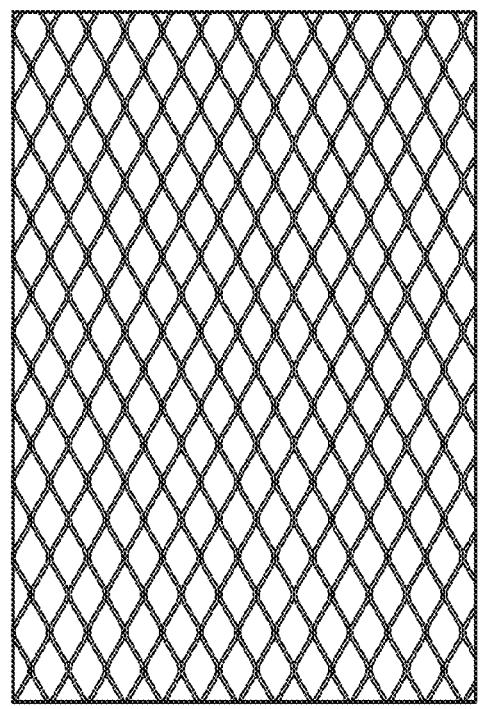

FIGS. 4A-4B are a set of two drawings of nonwoven, uncorrugated aluminum mesh suitable for inclusion in the compressible, thermally-conductive, removable nanocomposite gasket.

FIG. 4A is a drawing of nonwoven, uncorrugated aluminum ⅛-inch mesh suitable for inclusion in the compressible, thermally-conductive, removable nanocomposite gasket.

FIG. 4B is a drawing of nonwoven, uncorrugated aluminum 1/16-inch mesh suitable for inclusion in the compressible, thermally-conductive, removable nanocomposite gasket.

Figure 5:
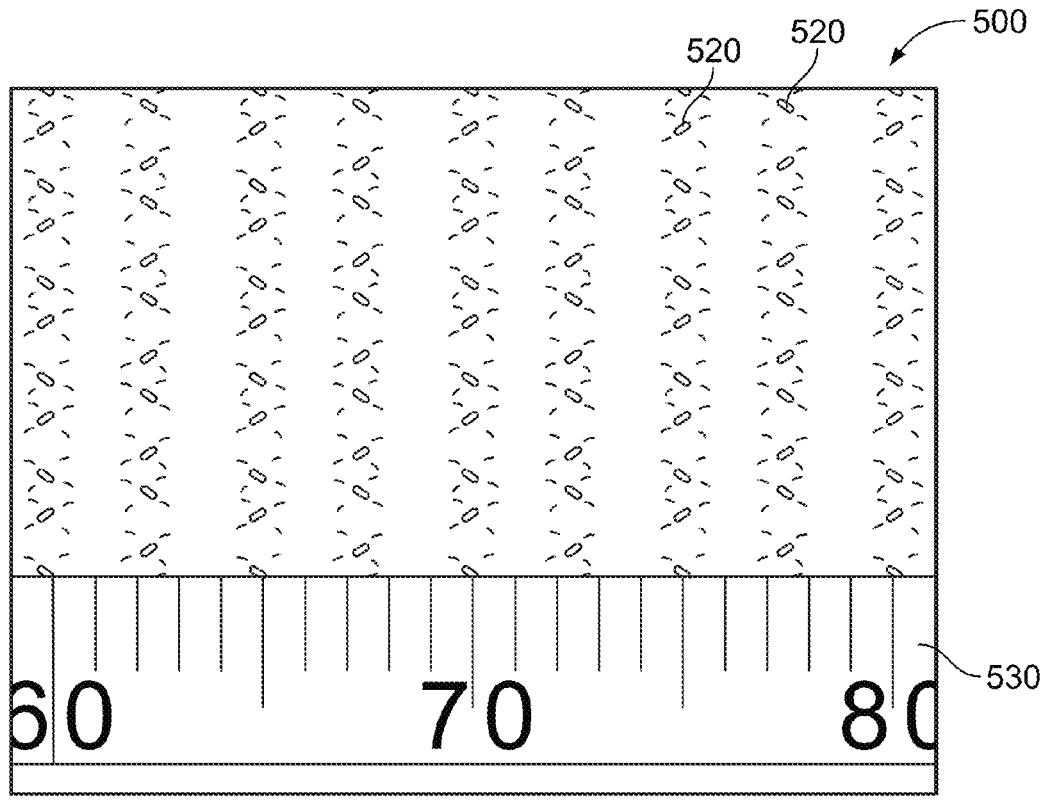
FIG. 5 is an illustration of an embedded, surface-exposed corrugated aluminum mesh suitable for inclusion in the compressible, thermally-conductive, removable nanocomposite gasket.

FIG. 5 is an illustration 500 of aluminum mesh 510 suitable for inclusion in the compressible, thermally-conductive, removable nanocomposite gasket. The mesh 510 is corrugated. The mesh 510 comprises a plurality of exposed corrugations 520. The size regime is graphically illustrated by a millimeter ruler 530.

Figure 6:
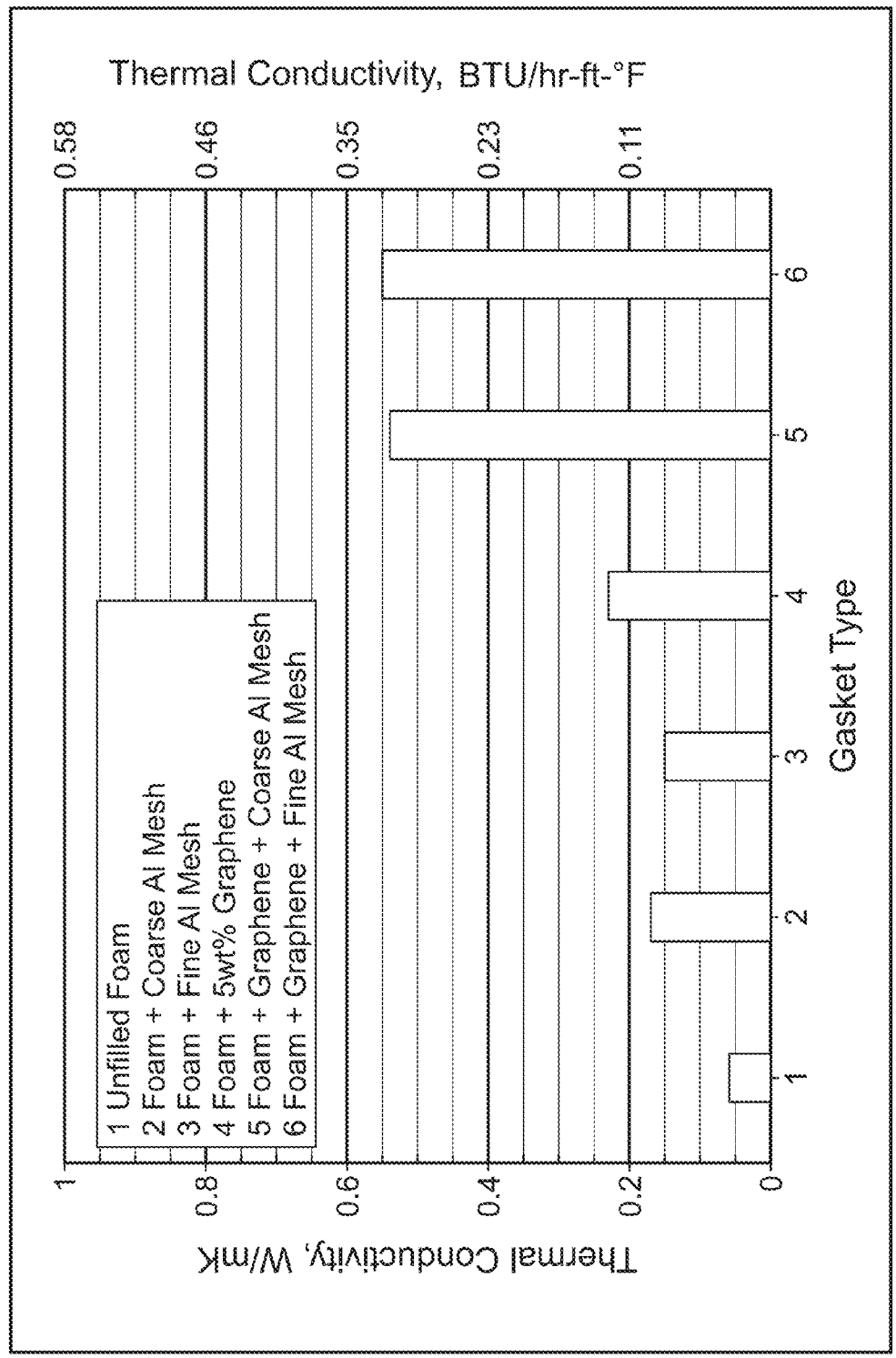
FIG. 6 is a bar graph showing thermal conductivity for six different uncompressed gasket types including a prior art gasket and five uncompressed, thermally-conductive, removable nanocomposite gaskets.

FIG. 6 is a bar graph showing thermal conductivity (in Watts per (meter-Kelvin) (W/mK) and in British Thermal Units per (hour-foot-degree Fahrenheit (BTU/hr-ft-° F.) for six different uncompressed gasket types including a prior art gasket and five uncompressed, thermally-conductive, removable nanocomposite gaskets.

More specifically, FIG. 6 is a bar graph showing thermal conductivity for a prior art uncompressed foam, for two uncompressed, thermally-conductive, removable nanocomposite gaskets comprising mesh and no graphene, for one uncompressed, thermally-conductive, removable nanocomposite gasket comprising graphene and no mesh, and for two uncompressed, thermally-conductive, removable nanocomposite gaskets comprising graphene and mesh.

Bar 1 shows thermal conductivity for uncompressed, unfilled silicone foam, a prior art foam manufactured by Smooth-On, Inc. of Macungie, Pa. (www.smooth-on.com). Bar 1 displays thermal conductivity of approximately 0.06 W/(m-K), a significantly lower value than any of the five uncompressed, thermally-conductive, removable nanocomposite gaskets depicted as bars 2 through 6 inclusive.

Bar 2 shows thermal conductivity for an uncompressed, thermally-conductive, removable foam gasket comprising coarse ⅛-inch aluminum mesh and no graphene.

Bar 3 shows thermal conductivity for an uncompressed, thermally-conductive, removable foam gasket comprising a fine 1/16-inch aluminum mesh and no graphene. Bars 2 and 3 display thermal conductivity of at least approximately 0.15 W/(m-K), a significantly higher value than that for the prior art.

Bar 4 shows thermal conductivity for an uncompressed, thermally-conductive, removable nanocomposite gasket comprising 5% graphene by weight and no mesh. Bar 4 displays thermal conductivity of at least approximately 0.23 W/(m-K), a significantly higher value than that for the prior art and a significantly higher value than those for the two uncompressed, thermally-conductive, removable foam gasket comprising aluminum mesh and no graphene.

Bar 5 shows thermal conductivity for an uncompressed, thermally-conductive, removable nanocomposite gasket comprising graphene and a coarse ⅛-inch aluminum mesh.

Bar 6 shows thermal conductivity for an uncompressed, thermally-conductive, removable nanocomposite gasket comprising graphene and a fine 1/16-inch aluminum mesh.

Bars 5 and 6 display thermal conductivity of at least approximately 0.54 W/(m-K), a significantly higher value than that for the prior art, a significantly higher value than those for the two uncompressed, thermally-conductive, removable foam gasket comprising aluminum mesh and no graphene, and a significantly higher value than that for the uncompressed, thermally-conductive, removable nanocomposite gasket comprising 5% graphene by weight and no mesh.

All six of the thermal conductivities shown in FIG. 6 are for uncompressed gaskets. When compressed according to embodiments of the invention, as suggested by FIG. 7 below, thermal conductivity will be at least two to three times the values shown in FIG. 6.

Figure 7:
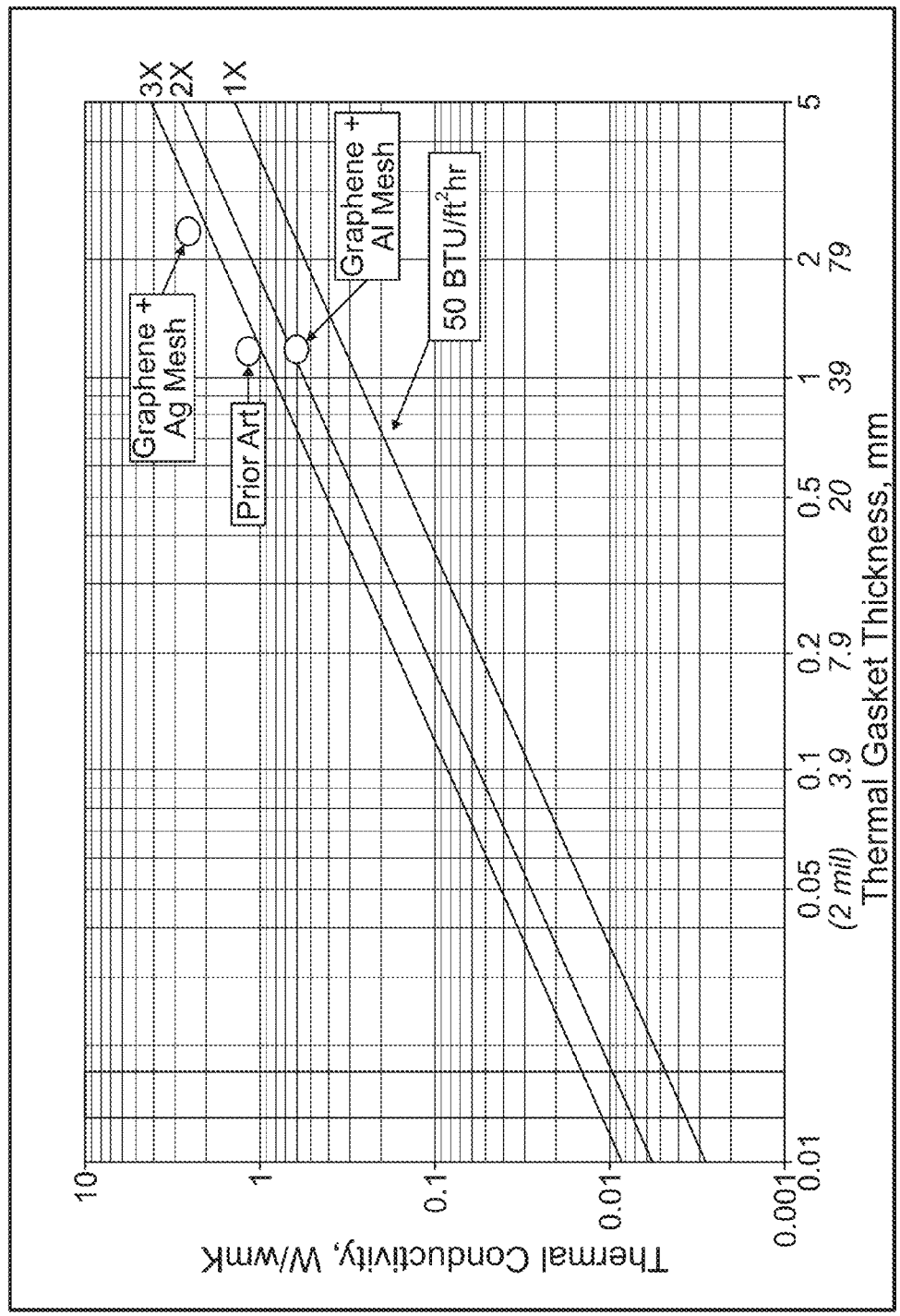
FIG. 7 is a graph of thermal conductivity as a function of gasket thickness for a prior art bonded conductive particle-filled silicone adhesive and for two compressed, thermally-conductive, removable nanocomposite gaskets.

FIG. 7 is a graph of thermal conductivity as a function of gasket thickness with diagonal lines drawn showing different levels of heat transfer for a prior art bonded conductive particle-filled silicone adhesive and for two compressed, thermally-conductive, removable nanocomposite gaskets. The compressed, thermally-conductive, removable nanocomposite gaskets shown in the plot are a gasket combining graphene and silver mesh, and a gasket combining graphene and aluminum mesh. The diagonal lines show heat transfer levels of 50 British Thermal Units per (square foot-hour) (BTU/ft² hr), 100 BTU/ft² hr (the line marked "2X") and 150 BTU/ft² hr (the line marked "3X").

Advantages of the compressed, thermally-conductive, removable nanocomposite gaskets are numerous. The removability of the compressed, thermally-conductive, removable nanocomposite gaskets permits gasket removal during disassembly via unbolting with no requirement to remove adhesive and no risk of damaging surfaces. The compressed, thermally-conductive, removable nanocomposite gaskets facilitate avoiding air gaps that may arise prior to the invention when accommodating different distances between uneven surfaces using prior art dense, adhesively bonded and unbonded elastomer slabs. Low filler loading facilitates maintaining foam integrity, elasticity, and gasket compressibility under large strains.

Aerospace applications can be met by the compressed, thermally-conductive, removable nanocomposite gaskets, including requirements that the gasket remain integral and elastically compressible with strains up to 100%, and that the gasket remain thermally and mechanically functional over a temperature range from approximately −100 degrees Centigrade (° C.) to approximately +150° C. The compressed, thermally-conductive, removable nanocomposite gaskets offer means for controlling one or more of compliance and compressibility of the compressed, thermally-conductive, removable nanocomposite gasket.

While the above representative embodiments have been described with certain components in exemplary configurations, it will be understood by one of ordinary skill in the art that other representative embodiments can be implemented using different configurations and/or different components.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A compressible, thermally-conductive nanocomposite gasket, comprising:
   an unbonded nanocomposite foam comprising partially oxidized graphene (GOx), wherein the carbon:oxygen (C:O) ratio of the GOx is adjusted using an elevated temperature treatment of the nanocomposite foam ranging between approximately 120 degrees Centigrade and approximately 180 degrees Centigrade, the elevated temperature treatment effects an in situ conversion of GOx to graphene;
   a compressible nanoparticle filler; and
   a corrugated metallic mesh embedded in the foam, wherein the mesh has thermal conductivity of at least approximately 1 Watt per meter-Kelvin [W/(m-K)], the mesh having a flexural modulus of less than approximately 0.5 GigaPascal (GPa),
   wherein the graphene enhances the thermal conductivity of the nanocomposite foam by a factor of at least approximately ten, wherein the nanocomposite foam has a filler loading of less than approximately 20%, wherein the thermally-conductive gasket is configured to be positioned between a heat source and a heat sink, so as to direct heat from the heat source to the heat sink, and wherein the thermally-conductive gasket is removable from the position between the heat source and the heat sink with no requirement to remove adhesive and no risk of damaging surfaces, the thermally-conductive gasket not comprising an adhesive, wherein the thermally conductive gasket has a thermal conductivity of at least approximately 0.54 Watts per meter-Kelvin [W/(m-K)].

* * * * *